Fig. 1.
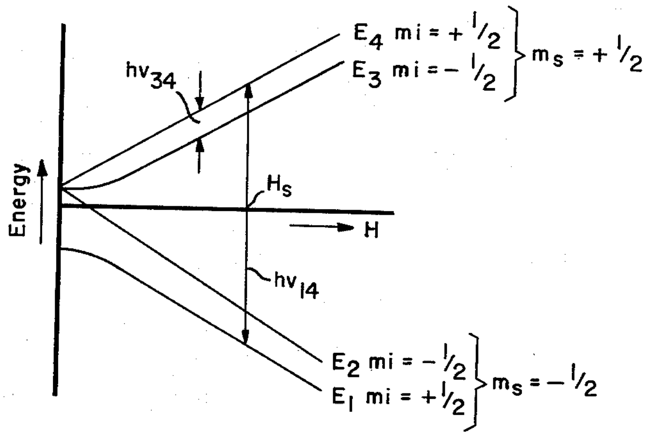
Fig. 2A. Fig. 2B.
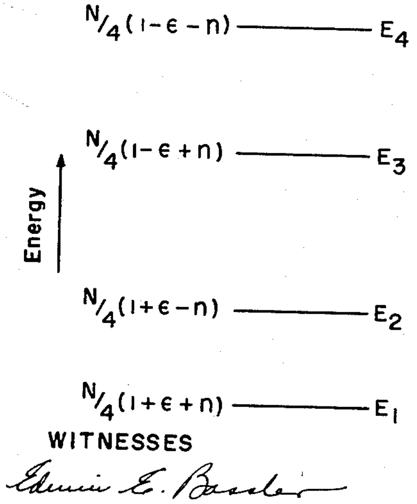
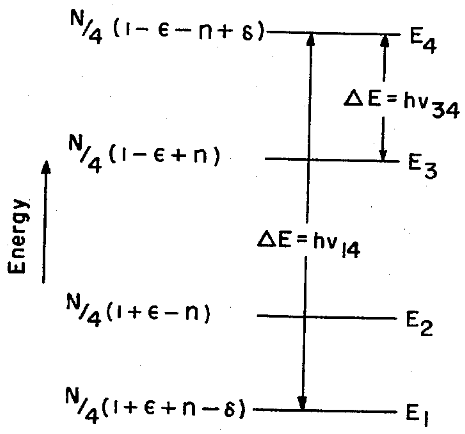
WITNESSES
Edwin E. Bassler
INVENTORS
Peter F. Chester
& Dan I. Bolef
BY
T. H. Murray
ATTORNEY United States Patent Office 2,997,581

Patented Aug. 22, 1961

2,997,581

FREQUENCY CONVERTER

Dan I. Bolef, Pittsburgh, and Peter F. Chester, Penn Township, Allegheny County, Pa., assignors to Westinghouse Electric Corporation, East Pittsburgh, Pa., a corporation of Pennsylvania Filed Aug. 19, 1957, Ser. No. 679,029
13 Claims. (Cl. 250—20)

This invention relates to a low noise frequency converter and more particularly to a solid state frequency converter which operates by stimulated emission of radiation.

As will become apparent from the following detailed description, the present invention is closely allied to a class of instruments known as "masers" which are solid state devices for amplifying electromagnetic energy by stimulated emission of radiation. The operation of such masers is dependent upon the fact that in paramagnetic materials, the electrons may be in different energy states. These states may be thought of as arising from the interaction of the magnetic moments associated with "spins" of the electrons with internal or external fields. They may, therefore, be referred to as "electron spin states." The energies of these electron spin states may be varied by an external magnetic field; and the energy difference between two given electron spin states is, in part, determined by the magnitude of this external magnetic field. For a full and detailed description of various types of masers and their operation, reference may be had to the following copending applications, all of which are assigned to the assignee of the present application: Serial No. 662,415, filed May 29, 1957; Serial No. 662,487, filed May 29, 1957, now abandoned; Serial No. 656,092, filed April 30, 1957, now abandoned; and Serial No. 656,093, filed April 30, 1957.

For the purposes of describing and defining this invention, the term "radio frequency" includes the portion of the energy spectrum which extends from sound frequencies of 10,000 cycles per second to the infrared light portion of the radiant energy spectrum, and the term "microwave" includes all radio frequencies above 2000 megacycles per second; the term "non-microwave" is used herein to denote the portion of the radio frequency spectrum below 2000 megacycles per second.

Heretofore, masers have been used to amplify low level microwave signals which must thereafter be converted to a non-microwave RF or IF signal for detection. An alternative approach which avoids the necessity for a microwave mixer is to convert the microwaves to a lower radio frequency at low level. Accordingly, it is a primary object of this invention to provide a low noise solid state device for converting microwaves to radio frequency signals of lower frequency at a low level, the resulting RF signal, which may be a non-microwave signal, being thereafter amplified by conventional techniques. If necessary, a non-microwave RF or IF maser may be used as the first stage in this amplification. Such a low frequency maser is easier to construct than a microwave maser.

Another object of the invention is to provide a solid state device employing the principle of hyperfine interaction between electrons and nuclei in a paramagnetic substance to achieve frequency conversion.

A further object of the invention is to provide a solid state frequency converter in which an input signal is employed to invert the energy state of electrons in a paramagnetic material.

A still further object of the invention is to provide a solid state frequency converter device which operates superregeneratively.

The above and other objects and features of the invention will become apparent from the following detailed description taken in connection with the accompanying drawings which form a part of this specification and in which:

FIGURE 1 is a graphical illustration of various energy levels existing in a paramagnetic material, showing the effect of hyperfine interaction and the effect of the magnitude of an applied external magnetic field;

FIGS. 2A and 2B are graphical illustrations of energy levels of electrons in a paramagnetic material for a particular value of an applied external magnetic field;

Figure 3:
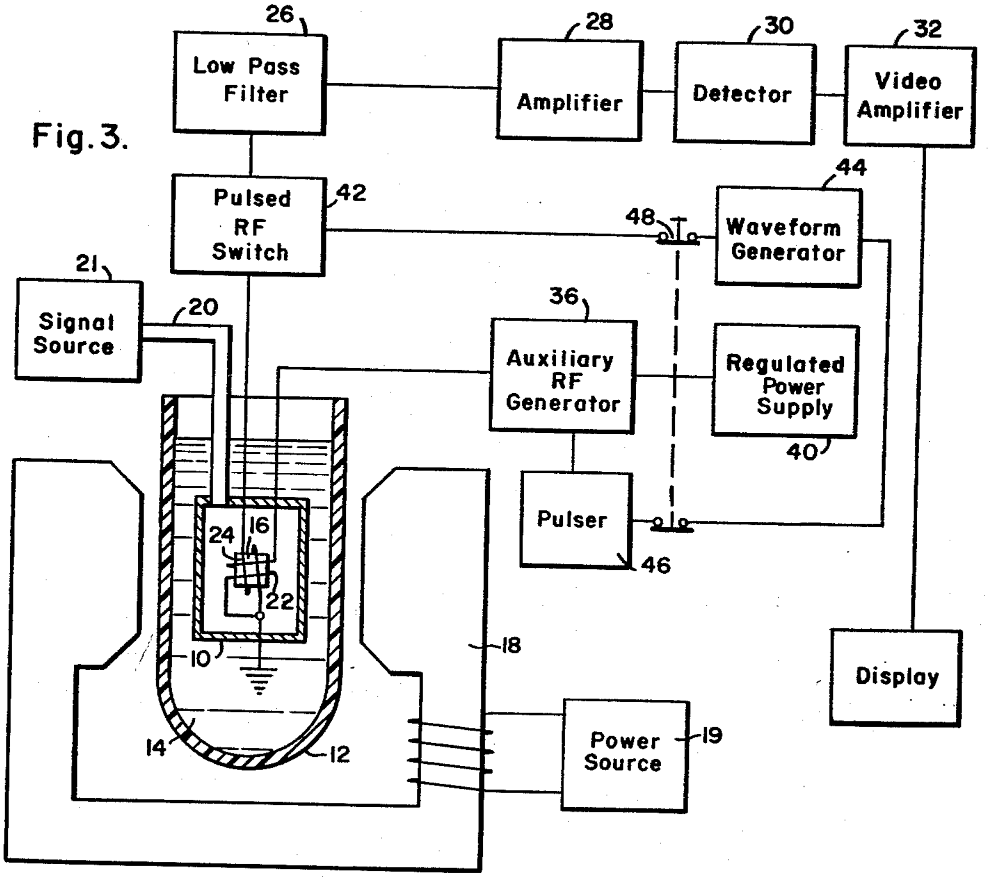
FIG. 3 is an illustration of one embodiment of the invention.

Referring to FIG. 1, four energy levels of electrons in certain paramagnetic materials under the influence of a magnetic field are identified by the lines $E_1$, $E_2$, $E_3$, and $E_4$. It is apparent from the graph that the spacing between the energy levels varies as a function of a magnetic field H applied to the paramagnetic material. In this respect, the spacing between states $E_1$ and $E_4$, and between states $E_2$ and $E_3$, increases as the external magnetic field increases. The spacing between states $E_1$ and $E_2$, and the spacing between states $E_3$ and $E_4$, however, remains relatively constant regardless of the magnitude of the applied magnetic field. It will be noted further that the energy levels $E_1$ and $E_2$ are closely spaced; whereas levels $E_3$ and $E_4$ are similarly closely spaced but higher than the first two. The aforesaid close spacing results from "hyperfine interaction" between the nuclei of the paramagnetic atoms and their associated electrons.

The hyperfine interaction results in a splitting of the electron energy levels into doublets when the spin of the nucleus is 1/2. The energy level diagrams of FIGS. 1 and 2 are characteristic of a paramagnetic material whose effective electron spin is 1/2 and whose nuclear spin is 1/2. The energy levels are designated by the high-field quantum numbers $m_I$ and $m_s$ for nucleus and electron respectively. Although in the more general case of $I>1/2$, $S\geqq 1/2$ the energy level configuration will be more complicated, similar considerations to those described for the simple case will apply.

Examples of paramagnetic materials which exhibit hyperfine interaction and may be suitable for use in the frequency converter are silicon doped with lithium arsenic, or phosphorus; and sodium plutonyl acetate. Examples of other paramagnetic materials with suitable energy level configurations, not necessarily involving hyperfine splittings, are: iron group salts such as $K_3Co(CN)_6$ diluted 0.1 percent with $K_3Cr(CN)_6$; or rare earth salts such as $La(C_2H_5SO_4)_3\cdot 9H_2O$ diluted 0.5 percent with $Gd(C_2H_5SO_4)_3\cdot 9H_2O$. Such paramagnetic materials are suitable for use in the frequency converter if, at a given magnetic field, three of its energy levels are so spaced that a microwave or other high frequency electromagnetic wave incident on the material will increase the population of the upper of two levels whose spacing corresponds to a lower ("readout") frequency. Rare earth salts, such as those of neodymium or europeum, irradiated materials such as single crystal quartz or alkali halides, and materials such as ruby, sapphire, or MgO doped with a paramagnetic ion such $Cr^{3+}$, may be useful for infrared detection (with "read-out" at microwave frequencies).

With reference to the case of simple hyperfine splitting, some of the electrons in the paramagnetic material will be in the lowest energy state $E_1$ shown in FIG. 1, while the remainder will be in higher energy states. This is shown in FIG. 2*a* where the energy states are illustrated for one particular value $H_S$ of the external magnetic field. In FIG. 2, N represents the total number of electrons in the paramagnetic material; $N\epsilon$ represents the excess of electrons in the sum of states $E_1$ and $E_2$ over the sum of states $E_3$ and $E_4$; and $(N/2)n$ represents the excess in state $E_1$ over $E_2$, or the excess in state $E_3$ over $E_4$ due to hyperfine interaction. Thus, in state $E_1$ the number of electrons is equal to $N/4(1+\epsilon+n)$; the number in energy state $E_2$ will be $N/4(1+\epsilon-n)$; the number in energy state $E_3$ will be $N/4(1-\epsilon+n)$; and so on.

Subject to quantum selection rules, electrons in the various energy states shown in FIG. 2*a* can interact with an electromagnetic radiation field of appropriate frequency and either absorb energy from the radiation field while advancing to a state of greater energy or, under the influence of the radiation field, can give up some of their energy and drop to a state of lower energy. The amount of energy thus transferred is related to the frequency of the radiation field by the equation:

$$E_{\text{upper}}-E_{\text{lower}}=h\nu$$

where the symbol $h$ is Planck's constant and $\nu$ is the frequency. It can be seen that the amount of energy thus transferred (i.e. $\Delta E$) is a direct function of the frequency of the radiation field.

If an electron in the lower energy state $E_2$ is under the influence of the magnetic field $H_S$ and is subjected to a microwave field having a frequency corresponding to the energy difference between the states $E_2$ and $E_3$, for example, it will absorb energy and advance to the upper energy state $E_3$. Similarly, if an electron in the lower energy state $E_1$ is under the influence of the magnetic field $H_S$ and is subjected to a microwave field having a frequency corresponding to the energy difference between states $E_1$ and $E_4$, it will advance to the highest energy state $E_4$. This condition is illustrated in FIG. 2*b* where the energy increase, $\Delta E$, is equal to $h\nu_{14}$. An electron in an upper state, on the other hand, may give up energy to an electromagnetic field and drop to a lower state. The probability of transition up or down is the same. Therefore, whether a system of many electrons exhibits a net absorption or net emission of energy depends upon whether more electrons are in a lower or an upper energy state. All such systems, when allowed to come to thermal equilibrium, have more electrons in the lower energy state and hence, are absorptive.

In order for the paramagnetic material to be in an emissive state, there must be an excess of electrons in an upper energy state over that in a lower state. Thus, if there is an excess of electrons in energy state $E_4$ over state $E_1$, the electrons in state $E_4$ can release energy and fall to energy state $E_1$. Likewise, if there is an excess of electrons in energy state $E_4$ over state $E_3$, the electrons in state $E_4$ may release energy while falling to energy level $E_3$. In any event, before the paramagnetic material will release energy, there must be an excess of electrons in an upper state over a lower state.

If the paramagnetic material is subjected to a microwave signal at frequency $\nu_{14}$, transitions will occur between energy levels $E_1$ and $E_4$ with the result that the population of energy level $E_4$ will be increased by a small amount $\delta$ and that of energy level $E_1$ decreased by the same amount. The magnitude of $\delta$ will depend upon the magnitude of the microwave signal of frequency $\nu_{14}$ and upon the relaxation times in a definite way. The populations of the various energy states will be as shown in FIG. 2*b*, where the total number of electrons in energy state $E_1$ is now reduced by the amount $\delta$ and the number of electrons in energy state $E_4$ is increased by this same amount. If the quantity $(1-\epsilon-n+\delta)$ in state $E_4$ is greater than the quantity $(1-\epsilon+n)$ in state $E_3$, it is apparent that an emissive state will exist between energy levels $E_4$ and $E_3$ and that radiation of frequency $\nu_{43}$ will be emitted due to noise or to deliberate stimulation. The power emitted at frequency $\nu_{43}$ will be proportional to $(\delta-2n)$ and for small values of $n$ will be proportional to $\delta$. Thus, the power out at frequency $\nu_{43}$ will be related in a definite way to the power in at frequency $\nu_{14}$. The frequency $\nu_{43}$ may, in particular, be a radio frequency in the tens of megacycles (as in the case of doped silicon). This will be apparent from the foregoing equation $\Delta E=h\nu$. If the difference in energy levels increases, the frequency required to cause a transition between levels increases also. Therefore, the frequency $\nu_{14}$ is much larger than the frequency $\nu_{43}$. In the particular case cited, the former is a microwave signal, while the latter is a non-microwave radio frequency signal.

Referring to FIG. 3, one embodiment of the invention for converting microwave energy to lower radio frequency energy is shown and comprises a microwave cavity 10 which is situated in a vessel 12 containing liquid helium 14 or some other suitable refrigerant. As will be understood, the cavity 10 is air-tight, whereby the liquid helium surrounds the outside of the cavity 10 only.

Within cavity 10 is situated a sample 16 of paramagnetic material. This material is subjected to an external magnetic field $H_S$ produced by electromagnet 18, the necessary power for magnet 18 being supplied by source 19. The magnet provides the necessary external magnetic field $H_S$ to establish or partially determine an energy difference between electron spin states. Microwave energy from signal source 21 which may be an antenna or any other radiation collecting device is fed into the cavity through waveguide 20. Surrounding the paramagnetic sample 16 are two radio frequency coils disposed at right angles with respect to each other. The first coil 22 is used to induce RF radiation between energy states $E_4$ and $E_3$ as shown in FIG. 2, while coil 24 is used to pick up or detect the resulting induced emission at RF frequencies. From coil 24 the radiation passes through low pass filter 26, amplifier 28, and detector 30 to a video amplifier 32 which controls a display device 34. In actual practice, the display device may constitute a cathode ray tube or other means for detecting a signal.

Radio frequency energy is applied to coil 22 from an RF generator which is supplied with electrical energy by power supply 40. In the connection between coil 24 and low pass filter 26, there is included an RF switch 42 which may in actual practice take the form of a transistor, vacuum tube, or any other suitable electrical RF switch. The switch 42 normally closes the circuit between coil 24 and filter 26; the switch may be periodically opened and coil 24 connected to a damping device by the output of a waveform generator 44. The same waveform generator triggers a pulser 46 which controls the RF generator 36. Waveform generator 44 may be selectively disconnected from switch 42 and pulser 46 by opening a manually operated switch 48. Thus, when switch 48 is closed, the RF generator 36 supplies pulses of radio frequency energy to coil 22 and switch 42 is periodically opened. However, when switch 48 is open, switch 42 is continuously closed and the generator 36 applies a continuous signal to coil 22.

Figure 4:
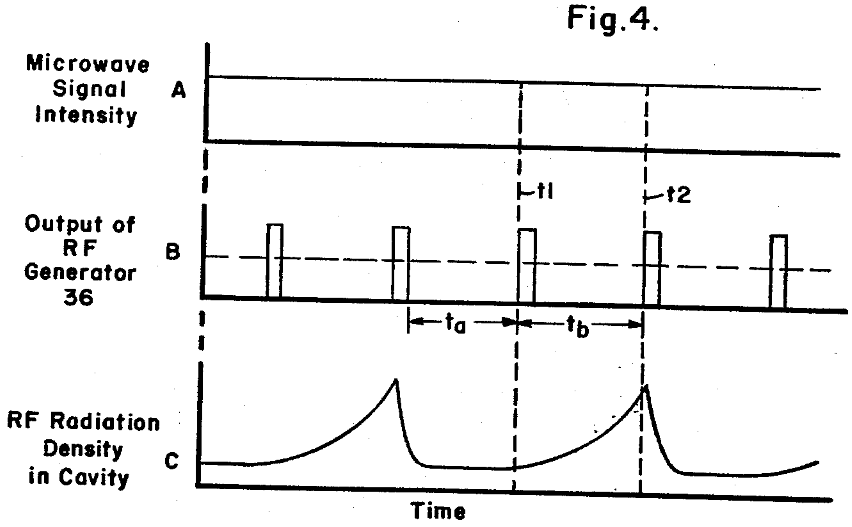
FIG. 4 is a graphical illustration of the operation of the invention shown in FIG. 3.

Operation of the invention may best be understood by reference to FIG. 4. The microwave signal in waveguide 20 is assumed for simplicity to have a constant signal intensity as shown by waveform A. This signal must be of a frequency corresponding to frequency $\nu_{14}$, as was explained above, to create an excess number of electrons in energy state $E_4$ over state $E_3$. The output of RF generator 36 with switch 48 closed is shown by the solid line waveform B. The pulses of RF energy shown induce stimulated emission between states $E_4$ and $E_3$ so that a signal of frequency $\nu_{43}$ is fed to filter 26 through switch 42. The RF radiation density in the cavity appears as waveform C when switch 48 is closed. During the period $t_a$, switch 42 is connected so as to lower the Q of coil 24 and an excess electron population builds up in state $E_4$ over state $E_3$. At time $t_1$, a pulse of RF energy is received from generator 36 which initiates oscillation build up in the cavity for the period $t_b$. At the same time, RF switch 42 is closed for a short period so that RF radiation in the cavity passes to low pass filter 26. If a critical number of excess electrons in state 4 over state 3 is achieved, super-regenerative operation is obtained. At time $t_2$ a pulse from generator 44 damps coil 24 so that oscillation ceases, re-initiating period $t_a$. If, however, switch 48 is open and a continuous RF signal is fed to coil 22 from generator 36 as shown by the dotted line in waveform B of FIG. 4, the RF radiation output picked up by coil 24 will be constant for the special case of constant microwave signal input.

It will be seen from FIG. 1 of the drawings that changing the applied magnetic field produced by magnet 18, and, therefore, the frequency $\nu_{14}$ does not effect a large change in the output frequency $\nu_{43}$. Thus, the device may be tunable over a wide range of microwave frequencies with little change in output frequency. For the same reason, by arranging for a small spread in field over the sample, a wide microwave band may be covered with a much smaller bandwidth in the output frequency of the system. Thus, the output amplifier of the system can be made to have a relatively narrow bandwidth with a resulting improvement in noise. Noise from the sample itself should be of the same order of magnitude as emitted by microwave masers operating at the same temperature. If the radiation of frequency $\nu_{43}$ is too weak for conventional amplification, it can be preamplified in an RF maser.

Depending upon the particular paramagnetic material used in the frequency converter and on the magnitude and direction (relative to the crystal axes) of the external magnetic field, the upper (signal) frequency may be in the infrared or microwave region, while the lower (output) frequency may be in the microwave or non-microwave radio frequency range.

Thus, the present invention provides a means for converting signals of a high frequency into signals having a lower frequency by the use of a paramagnetic substance situated within a resonant cavity. Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A solid state frequency converter comprising, in combination, a resonant cavity, paramagnetic material positioned within said cavity, means for subjecting said paramagnetic material to a substantially unvarying magnetic field, said paramagnetic material being characterized by hyperfine interaction between nuclei and their associated electrons, means for conveying microwave energy into said cavity, a first coil wound about the paramagnetic material positioned within said cavity, a second coil wound about said paramagnetic material at right angles with respect to said first coil, apparatus for applying radio frequency energy across said first coil, apparatus for amplifying radio frequency energy induced in said second coil, and electrical utilization apparatus operatively connected to said amplifying apparatus.

2. A solid state frequency converter comprising, in combination, a resonant cavity, paramagnetic material positioned within said cavity, means for subjecting said paramagnetic material to a substantially unvarying magnetic field, means for conveying microwave energy into said cavity, a first coil wound about the paramagnetic material positioned within said cavity, a second coil wound about said paramagnetic material at right angles with respect to said first coil, apparatus for applying radio frequency energy across said first coil, and apparatus for utilizing radio frequency energy induced in said second coil.

3. A solid state frequency converter comprising, in combination, a resonant cavity, paramagnetic material positioned within said cavity, means for subjecting said paramagnetic material to a substantially unvarying magnetic field, said paramagnetic material being characterized by having a plurality of electron energy levels, means for conveying microwave energy into said cavity, a first coil wound about the paramagnetic material positioned within said cavity, a second coil wound about said paramagnetic material, apparatus for applying radio frequency energy across said first coil, and apparatus connected to utilize radio frequency energy induced in said second coil.

4. A solid state frequency converter comprising, in combination, paramagnetic material characterized by hyperfine interaction between nuclei and their associated electrons, means for subjecting said paramagnetic material to a substantially unvarying magnetic field, means for subjecting said paramagnetic material to microwave energy, a first coil wound about the paramagnetic material, a second coil wound about said paramagnetic material, apparatus for applying radio frequency energy across said first coil, and means for utilizing radio frequency energy induced in said second coil.

5. A solid state frequency converter comprising, in combination, a resonant cavity, paramagnetic material positioned within said cavity, means for subjecting said paramagnetic material to a substantially unvarying magnetic field, said paramagnetic material being characterized by hyperfine interaction between nuclei and their associated electrons, means for conveying wave energy of a predetermined frequency into said cavity, a first coil wound about the paramagnetic material positioned within said cavity, a second coil wound about said paramagnetic material at right angles with respect to said first coil, apparatus for applying wave energy having a frequency lower than said predetermined frequency across said first coil, and apparatus for utilizing wave energy induced in said second coil.

6. A solid state frequency converter comprising, in combination, a resonant cavity, paramagnetic material positioned within said cavity, means for subjecting said paramagnetic material to a substantially unvarying magnetic field, means for conveying wave energy of a predetermined frequency into said cavity, a first coil wound about the paramagnetic material positioned within said cavity, a second coil wound about said paramagnetic material, apparatus for applying wave energy having a frequency lower than said predetermined frequency across said first coil, and means for utilizing wave energy induced in said second coil.

7. A solid state frequency converter comprising, in combination, a resonant cavity, paramagnetic material positioned within said cavity, means for subjecting said paramagnetic material to a substantially unvarying magnetic field, means for conveying wave energy of a predetermined frequency into said cavity, a first coil wound about the paramagnetic material positioned within said cavity, a second coil wound about said paramagnetic material, apparatus for applying wave energy across said first coil, and means for utilizing wave energy induced in said second coil.

8. A solid state frequency converter comprising, in combination, a resonant cavity, paramagnetic material positioned within said cavity, means for subjecting said paramagnetic material to a substantially unvarying magnetic field, means for constantly conveying microwave energy into said cavity, a first device inductively associated with the paramagnetic material positioned within said cavity, a second device inductively associated with said paramagnetic material, apparatus for applying pulsed radio frequency energy across said first device, and apparatus for utilizing wave energy induced in said second device.

9. A solid state frequency converter comprising, in combination, a resonant cavity, paramagnetic material positioned within said cavity, means for subjecting said paramagnetic material to a substantially unvarying magnetic field, said paramagnetic material being characterized by hyperfine interaction between nuclei and their associated electrons, means for conveying microwave energy into said cavity, a first device inductively associated with said paramagnetic material, a second device inductively associated with the paramagnetic material, apparatus for applying a constant source of radio frequency energy across said first device, and apparatus for amplifying radio frequency energy induced in said device.

10. A solid state frequency converter comprising, in combination, solid paramagnetic material characterized by hyperfine interaction between nuclei and their associated electrons, means for subjecting said paramagnetic material to a substantially unvarying magnetic field of predetermined polarity and magnitude, said paramagnetic material under the influence of said magnetic field having two pairs of energy levels of electrons, said two pairs including first, second, third, and fourth levels in ascending order of magnitude, one pair consisting of the first and second levels and the other pair consisting of the third and fourth levels, the first and second levels and the third and fourth energy levels being spaced from each other relatively small amounts and the second and third of said energy levels being spaced from each other a relatively large amount, the spacing between the second and third energy levels being substantially proportional to the magnitude of the magnetic field, the spacing between the first and second energy levels and the spacing between the third and fourth energy levels being substantially independent of variations in the magnitude of the magnetic field, means for subjecting said paramagnetic material to wave energy of a predetermined frequency in accordance with the characteristics of the paramagnetic material and the strength of the magnetic field whereby there results an excess of electrons in the higher energy level of one pair over the normal number of electrons in said last-named energy level, and wave energy pick-up means associated with said paramagnetic material for picking up energy of an additional frequency lower than said predetermined frequency resulting from radiation as electrons revert from the higher energy level of said last-named pair to the lower energy level of said last-named pair.

11. A solid state frequency converter comprising, in combination, solid paramagnetic material characterized by hyperfine interaction between nuclei and their associated electrons, means for subjecting said paramagnetic material to a substantially unvarying magnetic field of predetermined polarity and magnitude, said paramagnetic material under the influence of said magnetic field having two pairs of energy levels of electrons, said two pairs including first, second, third and fourth levels in ascending order of magnitude, one pair consisting of the first and second levels and the other pair consisting of the third and fourth levels, the first and second levels and the third and fourth energy levels being spaced from each other relatively small amounts and the second and third of said energy levels being spaced from each other a relatively large amount, the spacing between the second and third energy levels being a function of the strength of the magnetic field, the spacing between the first and second levels and the spacing between the third and fourth levels being substantially constant irrespective of variations in the strength of the magnetic field, means for applying a signal of predetermined frequency to be amplified to the paramagnetic material to subject the paramagnetic material to wave energy of predetermined frequency in accordance with the characteristics of the paramagnetic material and the strength of the magnetic field whereby electrons in one of the first and second energy levels are raised to the fourth energy level, and wave energy pick-up means associated with said paramagnetic material for picking up energy of an additional frequency lower than said predetermined frequency resulting from radiation as electrons revert from the fourth energy level to the third energy level, the amount of power in the wave energy picked up by the pick-up means being a function of the amount of power in said signal to be amplified.

12. A solid state frequency converter comprising, in combination, solid paramagnetic material characterized by hyperfine interaction between nuclei and their associated electrons, means for subjecting said paramagnetic material to a substantially unvarying magnetic field of predetermined polarity and magnitude, said paramagnetic material under the influence of said magnetic field having two pairs of energy levels of electrons, said two pairs including first, second, third and fourth levels in ascending order of magnitude, one pair consisting of the first and second levels and the other pair consisting of the third and fourth levels, the first and second levels and the third and fourth energy levels being spaced from each other relatively small amounts and the second and third of said energy levels being spaced from each other a relatively large amount, the spacing between the second and third energy levels being substantially proportional to the strength of the applied magnetic field, the spacing between the first and second energy levels and the spacing between the third and fourth energy levels being substantially independent of variations in the strength of the magnetic field, means for subjecting said paramagnetic material to wave energy of predetermined wave length in the infrared portion of the radiant energy spectrum, said wave energy in the infrared portion of the radiant energy spectrum causing electrons to move from one of the first and second energy levels to the fourth energy level in accordance with the characteristics of the paramagnetic material and the strength of the magnetic field whereby there results an excess of electrons in the fourth energy level over the normal electron population thereof, and wave energy pick-up means for picking up electromagnetic wave energy of microwave frequency associated with said paramagnetic material, electrons reverting from the fourth energy level to the third energy level and giving up energy at said microwave frequency, the energy of microwave frequency being a function of the strength of the wave energy in the infrared portion of the radiant energy spectrum applied to said paramagnetic material.

13. A solid state frequency converter comprising, in combination, solid paramagnetic material characterized by hyperfine interaction between nuclei and their associated electrons, means for subjecting said paramagnetic material to a substantially unvarying magnetic field of predetermined polarity and adjustable magnitude, said paramagnetic material under the influence of said magnetic field having two pairs of energy levels of electrons, said two pairs including first, second, third and fourth levels in ascending order of magnitude, one pair consisting of the first and second levels and the other pair consisting of the third and fourth levels, the first and second levels and the third and fourth energy levels being spaced from each other relatively small amounts and the second and third of said energy levels being spaced from each other a relatively large amount, means for applying a signal of predetermined frequency to be amplified to said paramagnetic material to subject said paramagnetic material to wave energy in accordance with the characteristics of the paramagnetic material and the strength of the magnetic field whereby electrons are transferred from one of said first and second energy levels to said fourth energy level producing an excess of electrons in the fourth energy level over the normal number of electrons therein, and wave energy pick-up means associated with said paramagnetic material for picking up energy of an additional frequency lower than said predetermined frequency resulting from radiation as electrons revert from the fourth energy level to the third energy level, an adjustment in the magnitude of the magnetic field varying the characteristics of the paramagnetic material whereby a further frequency different from said predetermined frequency causes the transition of electrons from one of the first and second energy levels to the fourth energy level, said additional frequency remaining substantially unchanged as the magnitude of the magnetic field is adjusted within predetermined limits.

References Cited in the file of this patent

UNITED STATES PATENTS

| | | |
|---|---|---|
| 2,762,871 | Dicke | Sept. 11, 1956 |
| 2,762,872 | Dicke | Sept. 11, 1956 |
| 2,909,654 | Bloembergen | Oct. 20, 1959 |

OTHER REFERENCES

"Proposal for a New Type Solid State Maser," by Bloembergen in "Physical Review," October 15, 1956, pages 324–327.

"International Dictionary of Physics and Electronics," Van Nostrand Co., 1956.

"Paramagnetic Resonance Detection along the Polarizing Field Direction" by Whitfield and Redfield, Physical Review June 1, 1957, page 918.